United States Patent
Miyanishi (10) Patent No.: US 7,973,832 B2
(45) Date of Patent: Jul. 5, 2011

(54) IMAGE PICKUP APPARATUS AND REGISTRATION CALL IMAGE PICKUP MODE

(75) Inventor: Mikio Miyanishi, Osaka (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 12/175,613

(22) Filed: Jul. 18, 2008

(65) Prior Publication Data

US 2009/0066807 A1    Mar. 12, 2009

(30) Foreign Application Priority Data

Sep. 11, 2007  (JP) ................................. 2007-235669

(51) Int. Cl.
*H04N 5/76*  (2006.01)
*H04N 5/235*  (2006.01)
*G03B 7/087*  (2006.01)
*G03B 7/097*  (2006.01)

(52) U.S. Cl. ...................... 348/231.6; 348/362; 396/243

(58) Field of Classification Search ............... 348/231.3, 348/231.6, 333.02, 362; 396/103, 236, 238, 396/242, 243
See application file for complete search history.

(56) References Cited

U.S. PATENT DOCUMENTS

| 5,416,556 | A | 5/1995 | Suzuki et al. |
| 5,903,786 | A * | 5/1999 | Goto ............................ 396/297 |
| 6,803,950 | B2 * | 10/2004 | Miyamoto et al. ......... 348/231.6 |
| 7,525,697 | B2 * | 4/2009 | Suekane et al. ................ 358/474 |
| 7,649,563 | B2 * | 1/2010 | Lee ........................... 348/333.02 |
| 7,830,441 | B2 * | 11/2010 | Tsukatani ................. 348/333.11 |
| 7,864,224 | B2 * | 1/2011 | Yoneda et al. ............. 348/231.2 |
| 2002/0054224 | A1 * | 5/2002 | Wasula et al. ................. 348/232 |
| 2004/0257459 | A1 * | 12/2004 | Shim ......................... 348/333.02 |
| 2005/0254793 | A1 * | 11/2005 | Son et al. ....................... 386/117 |
| 2006/0216016 | A1 | 9/2006 | Eun |
| 2007/0024735 | A1 * | 2/2007 | Yoneda et al. ........... 348/333.12 |
| 2007/0025721 | A1 | 2/2007 | Akagane |

FOREIGN PATENT DOCUMENTS

| CN | 1838736 A | | 9/2006 |
| JP | 2001186406 A | * | 7/2001 |
| JP | 2006253887 A | * | 9/2006 |
| JP | 2007-13476 | | 1/2007 |
| JP | 2007-41119 | | 2/2007 |

OTHER PUBLICATIONS

Samsung; "User's Manual Digimax V50".*
European Office Action issued Jan. 21, 2011 in corresponding European Application No. 08 161 694.

* cited by examiner

*Primary Examiner* — John M Villecco
(74) *Attorney, Agent, or Firm* — Oblon, Spivak, McClelland, Maier & Neustadt, L.L.P.

(57) ABSTRACT

An image pickup apparatus having a plurality of setting items related to an image pickup condition, the image pickup apparatus including: a setting unit adapted to set respective setting information of the plurality of setting items; a storage unit; a specification mean adapted to specify a registration target item to set a registration target from among the plurality of setting items in accordance with an instruction operation of a user; a registration control unit adapted to register the setting information set by the setting unit regarding the registration target item in the storage unit as a registration image pickup condition; and a generation unit adapted to call the registration image pickup condition from the storage unit in accordance with a call operation of the user to generate a new image pickup condition which reflects the registration image pickup condition.

11 Claims, 10 Drawing Sheets

| No. | SETTING ITEM |
|---|---|
| 1 | SHUTTER SPEED |
| 2 | APERTURE VALUE |
| 3 | DRIVE MORE |
| 4 | ISO SENSITIVITY |
| 5 | WHITE BALANCE |
| 6 | EXPOSURE COMPENSATION |
| 7 | IMAGE SIZE |
| 8 | IMAGE QUALITY |
| . | . . . . . |

| No. | SETTING ITEM | SELECT (SR) |
|---|---|---|
| 1 | SHUTTER SPEED | |
| 2 | APERTURE VALUE | ● |
| 3 | DRIVE MORE | |
| 4 | ISO SENSITIVITY | ● |
| 5 | WHITE BALANCE | ● |
| 6 | EXPOSURE COMPENSATION | |
| 7 | IMAGE SIZE | |
| 8 | IMAGE QUALITY | |
| . | . . . . . | |

| No. | SETTING ITEM | ALL (SRa) | REGISTRATION DESTINATION 1 (SRb) | REGISTRATION DESTINATION 2 (SRc) | REGISTRATION DESTINATION 3 (SRd) |
|---|---|---|---|---|---|
| 1 | SHUTTER SPEED | | | | |
| 2 | APERTURE VALUE | | | | |
| 3 | DRIVE MORE | ● | | | |
| 4 | ISO SENSITIVITY | | | | |
| 5 | WHITE BALANCE | | ● | | |
| 6 | EXPOSURE COMPENSATION | | | ● | ● |
| 7 | IMAGE SIZE | | ● | ● | ● |
| 8 | IMAGE QUALITY | ● | | | |
| · | ..... | | | | | ically carried out by the image pickup apparatus, the image
IMAGE PICKUP APPARATUS AND REGISTRATION CALL IMAGE PICKUP MODE

CROSS REFERENCES TO RELATED APPLICATIONS

The present invention contains subject matter related to Japanese Patent Application JP 2007-235669 filed in the Japanese Patent Office on Sep. 11, 2007, the entire contents of which are incorporated herein by reference.

BACKGROUND OF THE INVENTION

1. Field of the Invention

The present invention relates to a setting technology for an image pickup condition in an image pickup apparatus.

2. Description of the Related Art

In an image pickup apparatus such as a digital camera, when an image pickup operation is executed, various image pickup conditions are set in accordance with an image pickup situation (an image pickup scene), a subject, and the like.

The setting of the image pickup conditions is carried out by a user (hereinafter, also referred to "photographer") or the image pickup apparatus, and the user can decide the setting method by selecting an image pickup mode from among a plurality of image pickup modes provided to the image pickup apparatus.

To be more specific, as the image pickup mode, in a case where the setting of the image pickup conditions is automatically carried out by the image pickup apparatus, the image pickup conditions are automatically set by the image pickup apparatus.

In addition, as the image pickup mode, in the case of selecting a scene image pickup mode with which optimal image pickup conditions can be set in accordance with an image pickup scene, the image pickup conditions in accordance with the selected image pickup scene are automatically set by the image pickup apparatus, and also in a case where the set image pickup conditions are desired to be changed, the user can arbitrarily change the image pickup conditions through a manual operation (for example, refer to Japanese Unexamined Patent Application Publication No. 2007-13476).

SUMMARY OF THE INVENTION

Incidentally, in the image pickup apparatus having a registration call image pickup mode as the image pickup mode with which the image pickup conditions are set by calling previously registered image pickup conditions, when the registration call image pickup mode is selected, previously registered unique image pickup conditions are instantly called to be set in the image pickup apparatus. Thus, usability for the user is improved.

However, in the registration call image pickup mode, in order to meet a wide range of user's requests, almost all setting items are set as registration targets among the setting items of image pickup conditions. For this reason, such an inconvenience is generated that setting items which some users do not desire to set as the registration targets are also registered.

In view of the above, according to an embodiment of the present invention, it is desirable to provide an image pickup apparatus capable of eliminating such an inconvenience that the setting items which are not desired to be set as the registration targets are also registered.

The present invention has been made in order to solve the above-mentioned problem, and according to an embodiment of the present invention, there is provided an image pickup apparatus having a plurality of setting items related to an image pickup condition, the image pickup apparatus including: setting means adapted to set respective setting information of the plurality of setting items; storage means; specification means adapted to specify a registration target item to set a registration target from among the plurality of setting items in accordance with an instruction operation of a user; registration control means adapted to register the setting information set by the setting means regarding the registration target item in the storage means as a registration image pickup condition; and generation means adapted to call the registration image pickup condition from the storage means in accordance with a call operation of the user to generate a new image pickup condition which reflects the registration image pickup condition.

According to the embodiment of the present invention, the registration target item to be set as the registration target among the plurality of setting items is specified, and as the setting information regarding the registration target item is registered in the storage means as the registration image pickup condition, it is possible to eliminate such an inconvenience that the setting items which are not desired to be set as the registration targets are also registered.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment(s) supporting the claimed invention are described in this specification. Thus, even if an element in the following embodiment(s) is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment(s) are described in the claims. That is, the description does not deny the existence of aspects of the present invention that are described in the embodiment(s) but not claimed in the invention of this application, i.e., the existence of aspects of the present invention that in future may be claimed by a divisional application, or that may be additionally claimed through amendments.

Hereinafter, embodiments of the present invention will be described with reference to the drawings.

EMBODIMENTS

Structure

Figure 1:
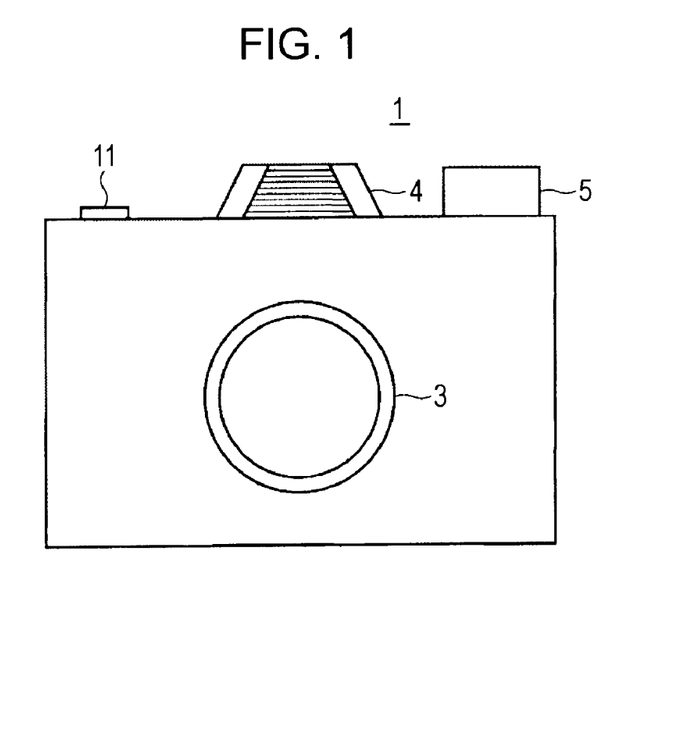
FIG. 1 illustrates an external appearance of an image pickup apparatus according to an embodiment of the present invention.
Figure 2:
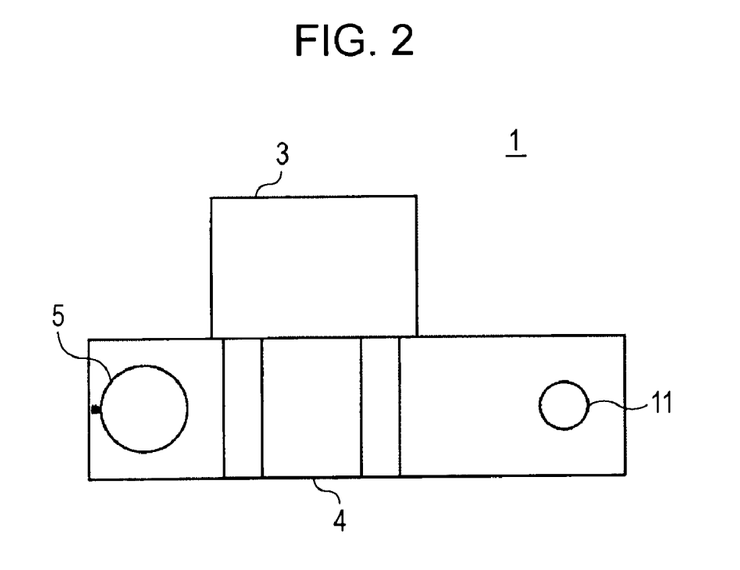
FIG. 2 illustrates an external appearance of the image pickup apparatus according to the embodiment of the present invention.
Figure 3:
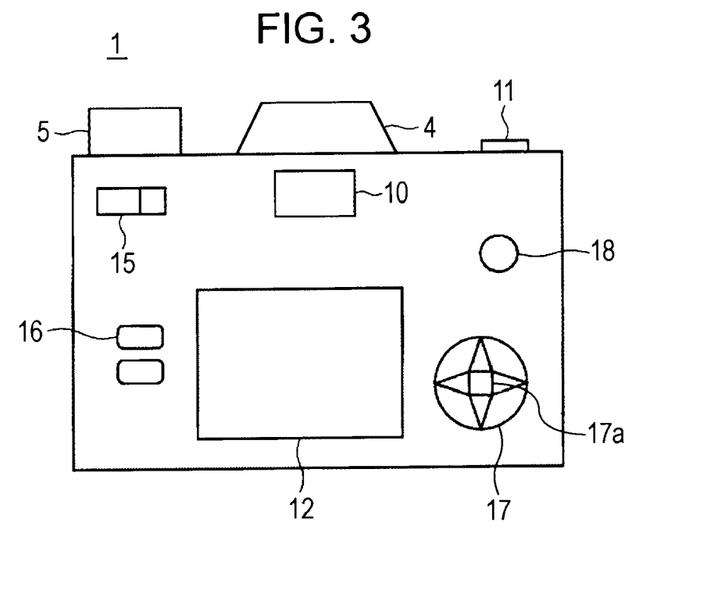
FIG. 3 illustrates an external appearance of the image pickup apparatus according to the embodiment of the present invention.
Figure 4:
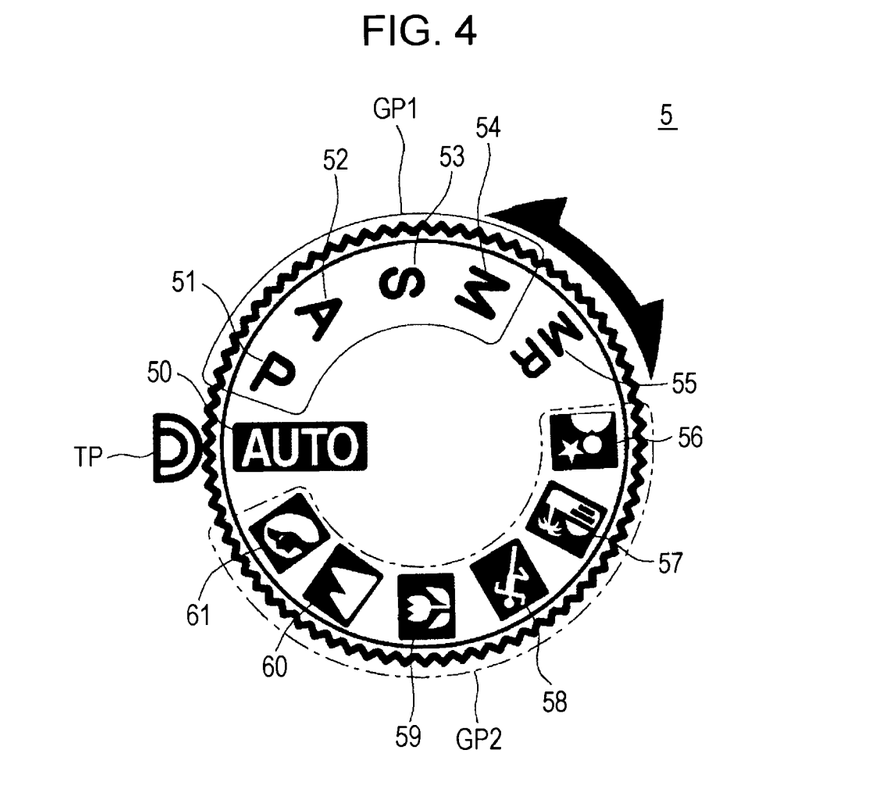
FIG. 4 illustrates a mode dial.

FIGS. 1 to 3 illustrate external structures of an image pickup apparatus 1 according to an embodiment of the present invention. Herein, FIG. 1 is a front external appearance of the image pickup apparatus 1, FIG. 2 is a top external appearance of the image pickup apparatus 1, and FIG. 3 is a back external appearance of the image pickup apparatus 1. FIG. 4 illustrates a mode dial 5.

The image pickup apparatus 1 is composed, for example, of a digital camera, and has an image pickup lens 3 on its front (refer to FIG. 1).

The image pickup lens 3 is mainly composed of a lens group, an aperture, and the like. The lens group includes, for example, a focus lens for changing a focal position through movement in an optical axis.

The image pickup apparatus 1 is provided with a release button 11 for instructing an exposure start, a flash 4, and the mode dial 5 on its top (refer to FIG. 2).

The release button 11 is a two-stage detection button capable of detecting two states including a half press state (S1 state) and a full press state (S2 state). When the release button 11 is half pressed to establish the S1 state, preparation operations for obtaining a recording still image related to a subject (actually captured image) (for example, an auto focus (AF) control operation based on a phase difference, an auto exposure (AE) control operation, and the like) are carried out. In addition, when the release button 11 is further pressed to establish the S2 state, the image pickup operation for the actually captured image (a series of operations including carrying out the exposure operation related to a subject image by using an image pickup element (which will be described later) and applying a predetermined image processing on image signals obtained through the exposure operation) is carried out.

The mode dial 5 is composed of a rotary disk-shaped member. As the user rotates the mode dial 5, a desired image pickup mode can be selected and activated.

To be more specific, as illustrated in FIG. 4, displays related to a plurality of image pickup modes 50 to 60 are marked on the mode dial 5. As the user sets a display related to the desired image pickup mode at a predetermined position TP, the image pickup apparatus 1 can be operated in the desired image pickup mode. Through such a specification of the image pickup mode, the user can instruct a basic setting method for the image pickup condition to the image pickup apparatus 1.

The image pickup apparatus 1 has, as the image pickup mode, an auto image pickup mode 50 in which the image pickup apparatus 1 automatically carries out a main setting for the image pickup condition, an exposure image pickup mode group GP1 (a group surrounded by a solid line) for specifying the image pickup condition related to the exposure (a shutter speed and an aperture value), a registration call image pickup mode (also referred to as "call mode") 55 for calling the previously registered image pickup condition to set the image pickup condition, and a scene image pickup mode group GP2 (a group surrounded by an alternate long and short dash line) capable of setting the image pickup condition in accordance with the image pickup situation (image pickup scene).

The exposure image pickup mode group GP1 includes a program mode (P mode) 51 in which the image pickup apparatus 1 decides both the shutter speed and the aperture value in accordance with a luminance of the subject, an aperture priority mode (A mode) 52 in which the image pickup apparatus 1 decides the shutter speed while prioritizing the aperture value decided by the user (in aperture priority), a shutter speed priority mode (S mode) 53 in which the image pickup apparatus 1 decides the aperture value while prioritizing the shutter speed decided by the user (in shutter speed), and a manual mode (M mode) 54 in which both the shutter speed and the aperture value are manually decided.

In addition, the scene image pickup mode group GP2 includes a portrait mode 61 used for a portrait image pickup, a landscape mode 60 used for a landscape image pickup, a macro mode 59 used for a nearby subject image pickup, a sport mode 58 used for a dynamic subject image pickup, an evening view mode 57 used for a sunset image pickup, and a night view mode 56 used for a night view image pickup.

While referring back to the description of the structure of the image pickup apparatus 1, the image pickup apparatus 1 is provided with a monitor 12, a finder window 10, a main switch (power switch) 15, a menu button 16, and a direction selection key 17 on its back (refer to FIG. 3).

To be more specific, the image pickup apparatus 1 is provided with a monitor (also referred to as "display unit") 12 substantially in the center of the back. The monitor 12 is structured, for example, as a color liquid crystal display (LCD). On the monitor 12, it is possible to display the menu screen for setting the image pickup condition and the like and to reproduce and display a captured image recorded in a recording device 104 (refer to FIG. 5) such as a memory card.

At an upper part of the monitor 12, the finder window 10 is provided. To the finder window 10, the subject image is guided. As the photographer looks through the finder window 10, the subject image is visually recognized, and it is possible to fix a composition.

At an upper left part of the monitor 12, the main switch 15 is provided. The main switch 15 is composed of 2 point slide switch. When a contact is set at an "OFF" position on the left, a power source of the image pickup apparatus 1 is turned OFF, and when the contact is set at an "ON" position on the right, the power source of the image pickup apparatus 1 is turned ON.

On a right side of the monitor 12, the direction selection key (cursor key) 17 is provided. Through the direction selection key 17, press operations in four directions including up, down, left, and right are detected. It should be noted that through the direction selection key 17, in addition to the above-mentioned four direction press operations, a press operation of a push button (enter button) 17a in a center part is also detected.

On a left side of the monitor 12, the menu button 16 is provided. When the menu button 16 is pressed, the monitor 12 displays the menu screen (setting screen). As the user carries out the selection or the setting operation (also simply referred to "menu operation") by using the direction selection key 17 or the like on the menu screen, setting of a detail operation of the image pickup apparatus 1 (for example, the AF mode), registration of the image pickup condition, and the like can be carried out.

Function

Figure 5:
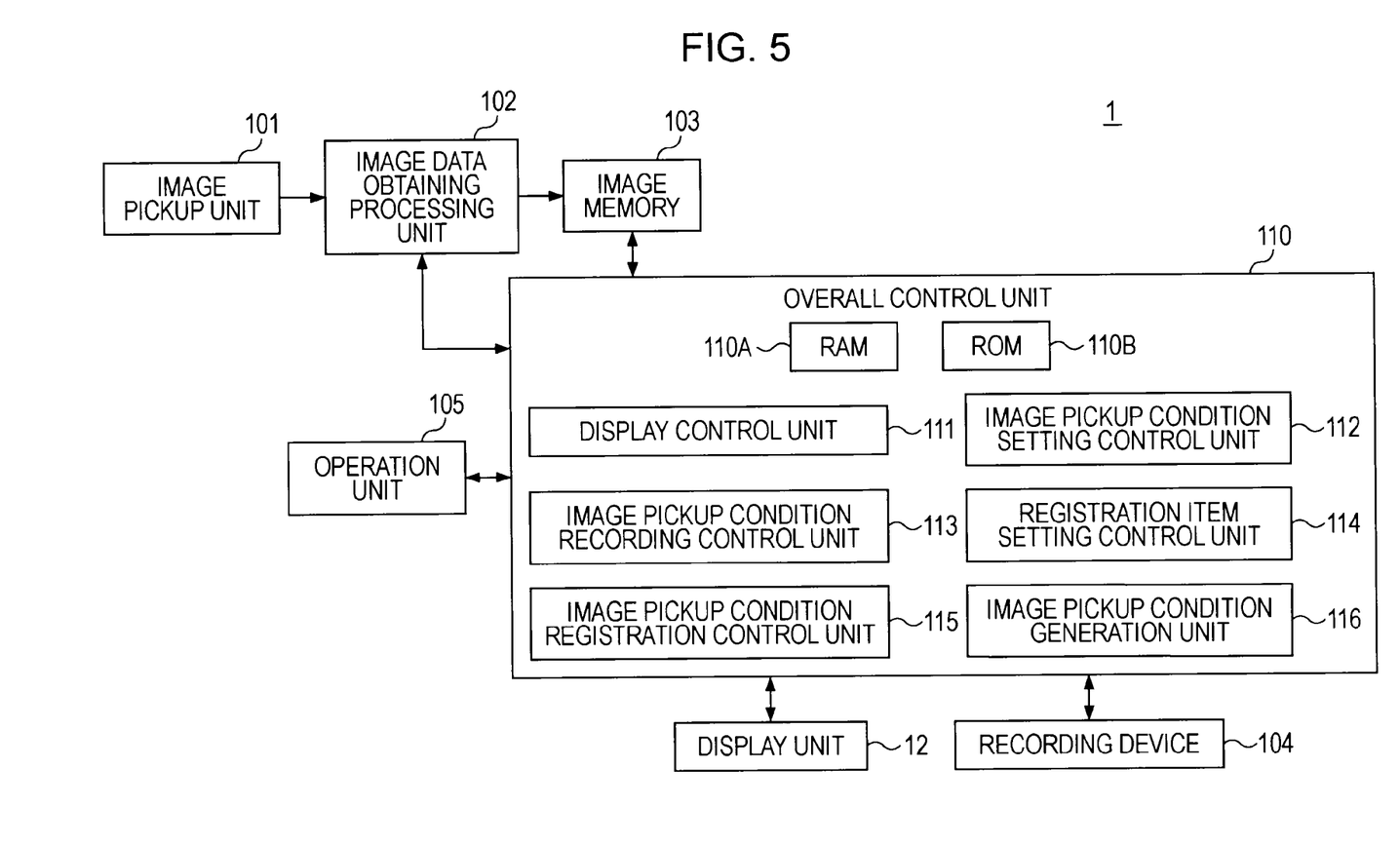
FIG. 5 is a block diagram of a function configuration of the image pickup apparatus.
Figure 6:
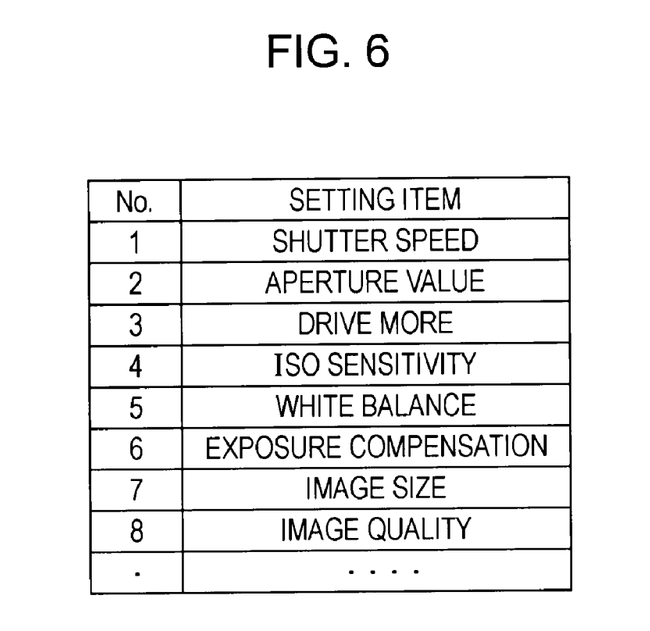
FIG. 6 illustrates items of an image pickup condition.
Figure 7:
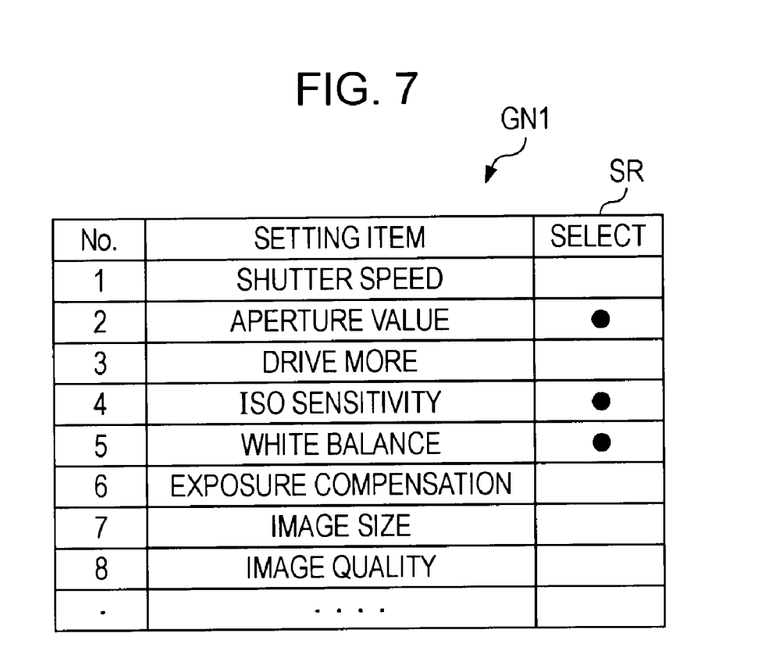
FIG. 7 illustrates an example of a registration item selection screen.
Figure 8:
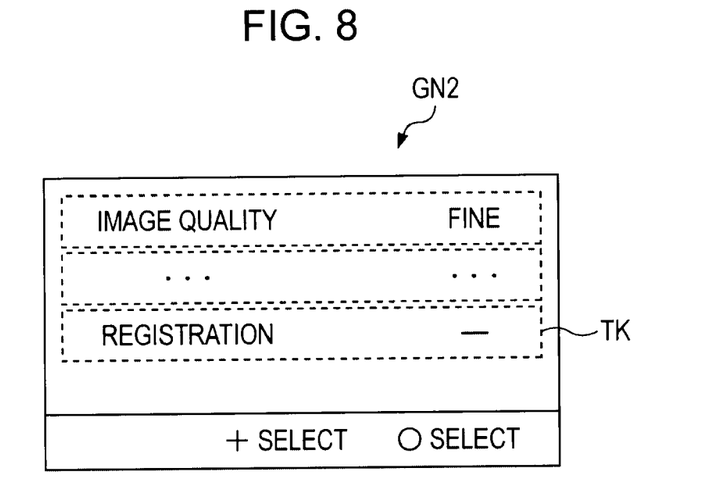
FIG. 8 illustrates an example of a menu screen.
Figure 9:
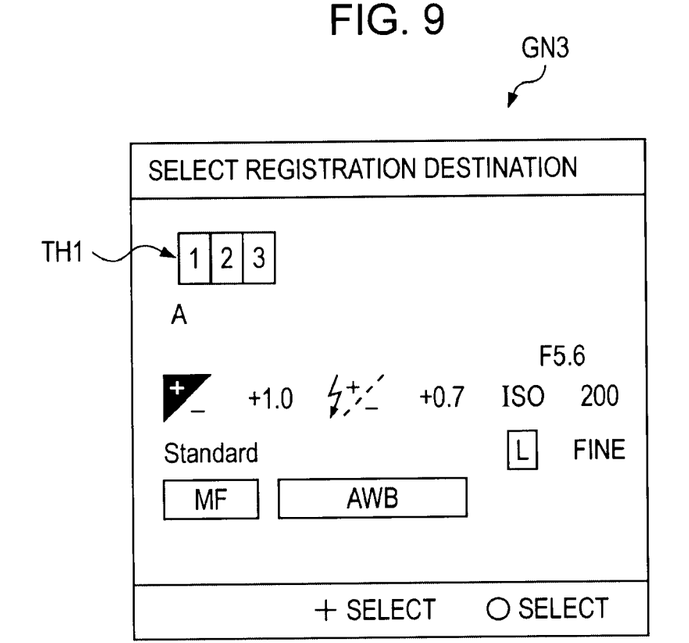
FIG. 9 illustrates an example of a registration setting screen.

Next, an outline of a function of the image pickup apparatus 1 will be described. FIG. 5 is a block diagram of a function configuration of the image pickup apparatus 1. FIG. 6 illustrates items of an image pickup condition. FIG. 7 illustrates an example of a registration item selection screen GN1. FIG. 8 illustrates an example of a menu screen GN2. FIG. 9 illustrates an example of a registration setting screen GN3.

As illustrated in FIG. 5, the image pickup apparatus 1 is provided with an image pickup unit 101, an image data obtaining processing unit 102, the image memory 103, the detachable and attachable recording device 104, an overall control unit 110, an operation unit 105, and the like.

The operation unit 105 is composed by being provided with various buttons and switches including the release button 11, the mode dial 5 (refer to FIG. 1), and the menu button 16. In response to an input operation of the user on the operation unit 105, the overall control unit 110 and the like realize various operations. For example, when the full press state of the release button 11 is detected, the image pickup operation of the actually captured image is executed.

The image pickup unit 101 is composed by being provided with an optical sensor such as an image pickup element (a CCD or a CMOS), or the like. The image pickup element exposes the subject image formed on a light receiving surface (charge accumulation based on photoelectric conversion) to generate an image signal related to the subject image. To be more specific, the image pickup element is composed as a Bayer arrangement color sensor (for example, CCD) in which a plurality of pixels composed by having photo diodes are two dimensionally arranged in a matrix, and primary color transmission filters of R (red), G (green), and B (blue) are arranged on the light receiving surface of the respective pixels in a checkered pattern. Then, the image pickup element converts the formed subject optical image into analog electric signals of the respective color components of R (red), G (green), and B (blue) to generate an image signal.

In accordance with the instruction operation of the user by using the operation unit 105 (to be more specific, in accordance with the image pickup instruction operation output from the overall control unit 110 while detecting the press operation of the release button 11), the image data obtaining processing unit 102 has a function of obtaining the image signal from the image pickup unit 101 applies a predetermined image processing to obtain image data related to the captured image.

The image memory 103 is composed of a non-volatile memory and has a volume with which it is possible to store the image data for a plurality of frames. The image memory 103 has a function of temporarily storing the image data subjected to the predetermined processing obtained by the image data obtaining processing unit 102.

The overall control unit 110 is composed as a micro computer, and provided mainly with a CPU, a RAM 110A, a ROM 110B, and the like. It should be noted that according to the present embodiment, such a case is exemplified that a writable and erasable non-volatile memory (for example, Erasable Programmable ROM: EPROM) is adopted as the ROM 110B.

The overall control unit 110 reads out a program stored in the ROM 110B, and by executing the program in the CPU, various functions are realized. A display control unit 111, an image pickup condition setting control unit 112, an image pickup condition recording control unit 113, a registration item setting control unit 114, an image pickup condition registration control unit 115, and an image pickup condition generation unit 116 in FIG. 5 are functions realized by executing the program in the overall control unit 110 while being represented as a function block.

The display control unit 111 instructs the display of the captured image, the menu screen, or the like to the display unit 102.

To be more specific, in accordance with the instruction operation of the user input from the operation unit 105, the display control unit 111 transfers the image data of the image to be displayed on the monitor 12 from the image memory 103 or the recording device 104 to the RAM 110A, and also carries out a necessary processing to display the image data on the display unit 102. To be specific, the image data stored in the image memory 103 is reproduced and displayed on the display unit 102 as a still image immediately after the image pickup, or in a case where the image pickup apparatus 1 has a function of live view, the image data is displayed on the display unit 102 as a live view image in a motion picture manner. On the other hand, the image data stored in the recording device 104 is reproduced and displayed on the display unit 102. Also, in accordance with the operation of the menu button 16 or the like, the display control unit 111 displays a predetermined menu screen on the display unit 102.

The image pickup condition setting control unit 112 sets the image pickup condition in accordance with an image pickup condition setting operation RP1 by the user with use of the operation unit 105 such as the menu button 16 or the direction selection key 17.

The image pickup condition which can be set in the image pickup apparatus 1 is branched into a plurality of items (also referred to "setting items") as illustrated in FIG. 6. As specific setting items, for example, the shutter speed, the aperture value, the drive mode, the ISO sensitivity, and the like exist. Through the instruction operation by using the operation unit 105, the user can change a setting value of the respective setting items (also referred to "setting information"). Then, the image pickup condition setting control unit 112 reflects the change of the setting information on the image pickup apparatus 1. It should be noted that in a default state, appropriate setting information is previously set in the respective setting items. For example, as the setting information in the default state for the white balance, an auto setting mode (auto white balance: AWB) is set.

In a case where the image pickup mode is set in the respective image pickup modes 51 to 54 within the exposure image pickup mode group GP1, when the image pickup mode is changed (transited) through the dial operation of the mode dial 5, the image pickup condition recording control unit 113 records the image pickup condition immediately before the mode change (the setting information of the respective setting items) in the storage unit (herein, the RAM 110A) as the saved image pickup condition (also simply referred to "saved condition"). For example, in a state where the image pickup mode is set the P mode 51, in a case where the mode is changed to another image pickup mode, the image pickup condition set in the P mode 51 is recorded in the RAM 110A.

Also, in a case where the image pickup mode is set in the respective image pickup modes 51 to 54 within the exposure image pickup mode group GP1, when the power source off operation of the image pickup apparatus 1 is detected, before the power source is turned OFF, the image pickup condition recording control unit 113 records the current image pickup condition in the ROM 110B as the saved image pickup condition.

It should be noted that in a case where the power source of the image pickup apparatus 1 is turned OFF or no operation state continues for a certain period of time and the image pickup apparatus 1 enters a state of saving the power (also referred to "power save state" or simply referred to "power save") as well, the saved image pickup condition recorded in the RAM 110A is save without a loss. To be more specific, when the power source of the image pickup apparatus 1 is turned OFF or the power save state is entered, the saved image pickup condition is stored in the ROM 110B. When the power source of the image pickup apparatus 1 is turned ON or the power save state is cancelled, the saved image pickup condition is read out from the ROM 110B into the RAM 110A, and the saved image pickup condition before the power source being turned OFF or the power save is recorded in the RAM 110A. In this manner, at the time of the power source being turned OFF or the power save, as the ROM 110B is caused to function as the storage unit which stores the saved image pickup condition, even in a case where the power source of the image pickup apparatus 1 is turned OFF or the power save state is entered, it is possible to save the saved image pickup condition without a loss.

In accordance with a registration item selection operation RP2 by the user with use of the operation unit 105, the registration item setting control unit 114 carries out a control as to whether the respective setting items are set as the registration target items (also simply referred to "registration items"). It should be noted that in accordance with the registration item selection operation RP2 by the user, it can also be described that the registration item setting control unit 114 has a function of specifying the setting items to be set as the registration target among the respective setting items.

To be more specific, first, a registration item selection operation RP2 is performed by the user on a registration item selection screen displayed on the display unit 102 through the menu operation. To be more specific, the user can select the setting items to be set as the registration target through the instruction operation by using the direction selection key 17 on the registration item selection screen GN1 illustrated in FIG. 7. In a select column SR of the setting item selected as the registration item, a select display indicating that the item is selected (herein, a filled circle) is added. For example, in FIG. 7, the respective setting items of the aperture value, the ISO sensitivity, and the white balance are selected as the registration items. Then, the setting items selected through the registration item selection operation RP2 are registered in the RAM 110A as the registration items by the registration item setting control unit 114.

The setting information of the thus set registration items is registered in the RAM 110A when a registration operation RP3 of the image pickup condition is carried out (which will be described later). It should be noted that in the default state before the registration item selection operation RP2 is executed, all the setting items are registered as the registration items in the RAM 110A.

In accordance with the image pickup condition registration operation RP3 of the user, the image pickup condition registration control unit 115 registers the setting information of the registration items as the registration image pickup condition in the storage unit (the RAM 110A).

To be more specific, after the image pickup apparatus 1 is set in a desired image pickup condition, the user selects a "registration" item TK on a menu screen GN2 (refer to FIG. 8) which is displayed when the menu button 16 is pressed, to thereby display the registration setting screen GN3 (refer to FIG. 9). Then, the user uses the direction selection key 17 to select a registration destination of the image pickup condition from a registration destination display TH1 (in FIG. 9, "registration destination 1" is selected), and the enter button 17a is pressed. It should be noted that the image pickup apparatus 1 according to the present embodiment has three registration destinations as the registration destination of the image pickup condition, but the number of the registration destinations is not limited to three.

When such an image pickup condition registration operation RP3 is executed, through the image pickup condition registration control unit 115, the setting information of the currently set registration items is registered in the RAM 110A. For example, as illustrated in FIG. 7, the respective setting items of "aperture value", "ISO sensitivity", and "white balance" are selected as the registration items, and in a case where the respective setting items are registered as the registration items, through the image pickup condition registration control unit 115, the respective setting information of "aperture value", "ISO sensitivity", and "white balance" are registered in the RAM 110A as the registration image pickup condition. Also, for example, in a case where all the setting items are registered as the registration items, the setting information of all the setting items are registered as the registration image pickup condition in the RAM 110A.

It should be noted that even in a case where the power source of the image pickup apparatus 1 is turned OFF or the power save state is entered, the registration image pickup condition registered in the RAM 110A is saved without a loss. To be more specific, when the power source of the image pickup apparatus 1 is turned OFF or the power save state is entered, the registration image pickup condition is stored in the ROM 110B. When the power source of the image pickup apparatus 1 is turned ON or the power save state is cancelled, the registration image pickup condition is read out from the ROM 110B into the RAM 110A, and the registration image pickup condition before the power source to be turned OFF or the power save is recorded in the RAM 110A. In this manner, at the time of the power source being turned OFF or the power save, as the ROM 110B is caused to function as the storage unit which stores the registration image pickup condition, even in a case where the power source is turned OFF or the power save state is entered as well, it is possible for the image pickup apparatus 1 to save the registration image pickup condition without a loss.

When the change of the image pickup mode (also referred to "mode change" or "mode transition") is carried out, the image pickup condition generation unit 116 generates the image pickup condition to be set in the image pickup mode after the change. The detail will be described later.

Generation of Image Pickup Condition

Figure 10:
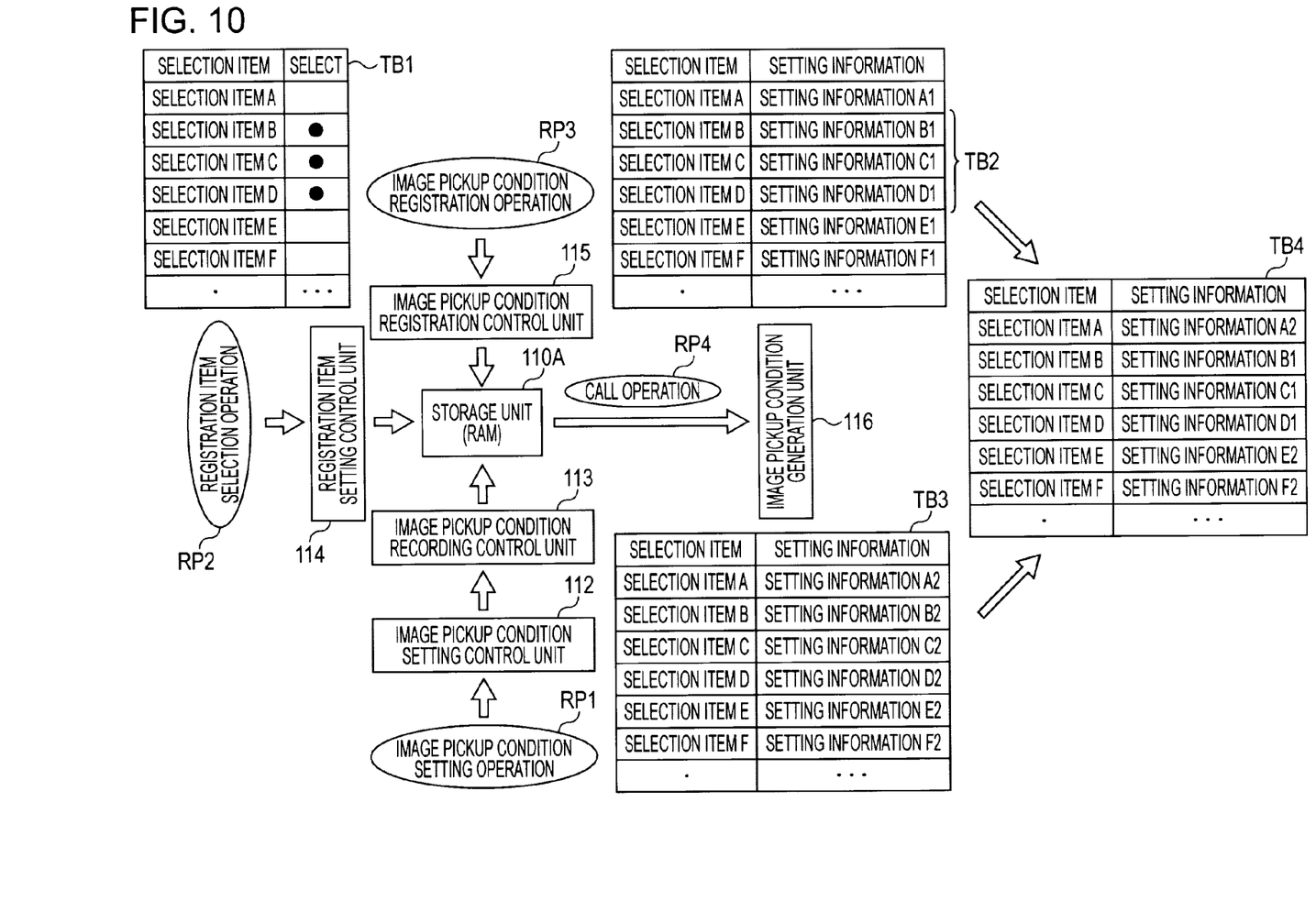
FIG. 10 is a conceptual diagram illustrating generation of an image pickup condition when a registration call image pickup mode is set.
Figure 11:
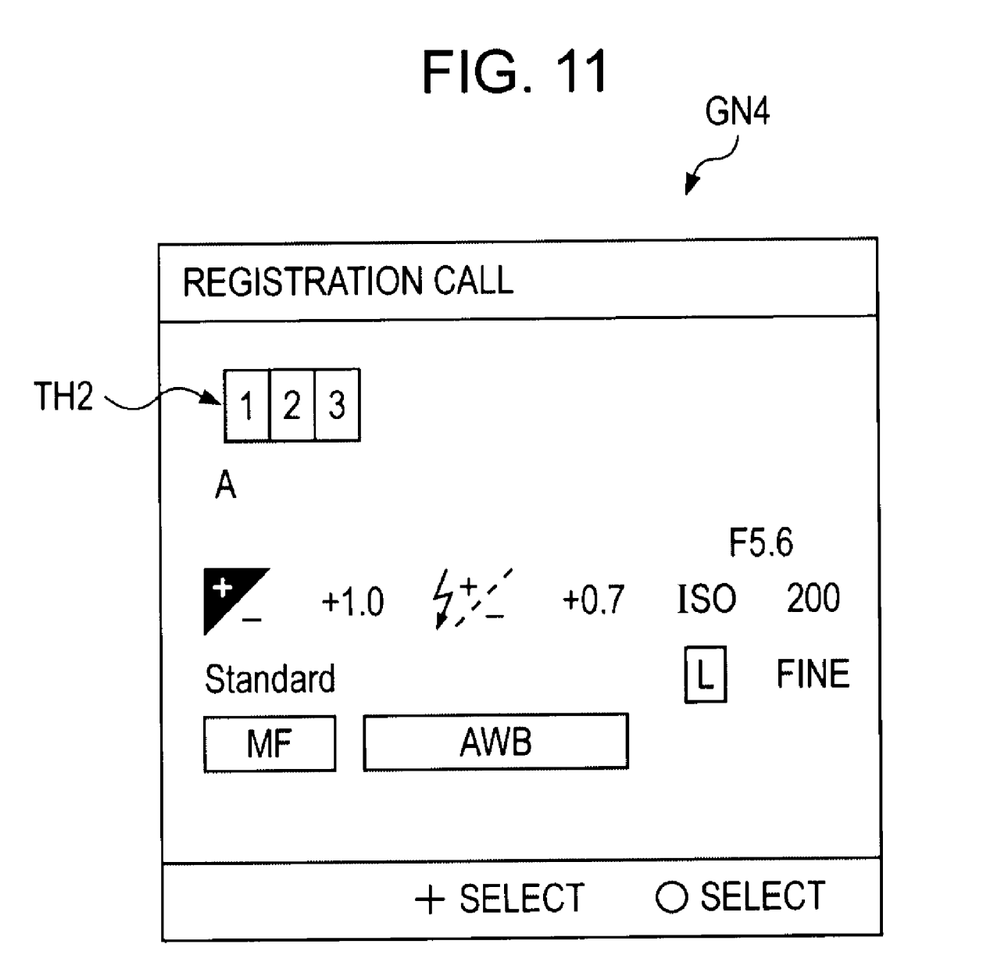
FIG. 11 illustrates an example of a screen for carrying out a call operation of a registration image pickup condition.
Figure 12:
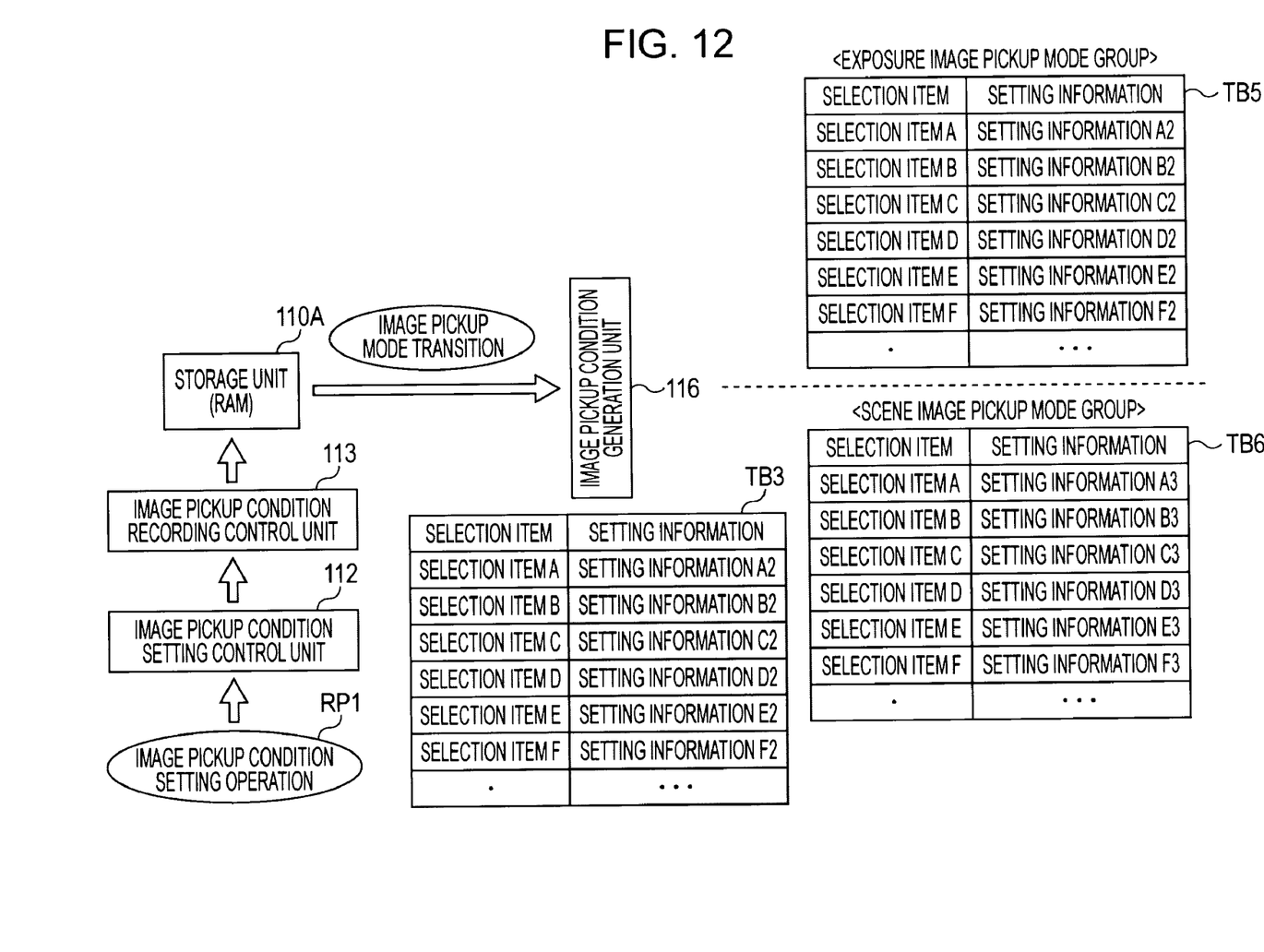
FIG. 12 is a conceptual diagram illustrating generation of an image pickup condition when an exposure image pickup mode group and a scene image pickup mode group are set.

Hereinafter, the generation of the image pickup condition executed at the time of the mode change is described in detail. FIG. 10 is a conceptual diagram illustrating the generation of the image pickup condition when the registration call image pickup mode 55 is set. FIG. 11 illustrates an example of a screen for carrying out the call operation of the registration image pickup condition. FIG. 12 is a conceptual diagram illustrating the generation of the image pickup condition when the exposure image pickup mode group GP1 and the scene image pickup mode group GP2 are set.

In the image pickup apparatus 1, when the mode change is carried out, a new image pickup condition is generated by the image pickup condition generation unit 116, and the new image pickup condition is set in the image pickup apparatus 1.

A generation method for the image pickup condition generation differs depending on a type of the image pickup mode set after the mode change. Hereinafter, the generation method will be separately described in the following cases: a case where the registration call image pickup mode 55 is set, a case where one of the image pickup modes 51 to 54 within the exposure image pickup mode group GP1 is set, a case where one of the image pickup modes 56 to 60 within the scene image pickup mode group GP2 is set, and a case where the auto image pickup mode 50 is set.

First, the generation method for the image pickup condition generation in the case where the image pickup mode is set in the registration call image pickup mode 55 will be described. It should be noted that hereinafter, as illustrated in FIG. 10, such a state ST is described as an example that "setting items B", "setting items C", and "setting items D" are registered as the registration items (refer to a table TB1 in FIG. 10) through the registration item selection operation RP2, and the respective setting information of the registration items (the setting items B, C, D) is registered as the registration image pickup condition TB2 in the RAM 110A through the image pickup condition registration operation RP3 executed thereafter. Also, in the state ST illustrated in FIG. 10, an image pickup condition TB3 in one of the image pickup modes 51 to 54 within the exposure image pickup mode group GP1 set before being set in the registration call image pickup mode 55 exists as the saved image pickup condition.

In a case where the registration call image pickup mode 55 is set, in accordance with a call operation RP4 for the image pickup condition (which will be described later), the image pickup condition registered in the storage unit (the RAM 110A) is called by the image pickup condition generation unit 116, and a new image pickup condition which reflects the image pickup condition is generated.

To be more specific, in the state ST where the registration image pickup condition TB2 is registered in the RAM 110A (refer to FIG. 10), when the user sets the image pickup mode as the registration call image pickup mode 55 and carries out the call operation RP4 for the image pickup condition, the setting information of the registration items registered as the registration image pickup condition TB2 is called from the RAM 110A, and the setting information of the registration items is adopted as the corresponding setting information of the setting items in the new image pickup condition TB4. To be more specific, "setting information B1", "setting information C1", and "setting information D1" of the registration image pickup condition TB2 are called from the RAM 110A, and the respective setting information B1, C1, and D1 is set as the respective setting information of the setting items B, the setting items C, and the setting items D in the new image pickup condition TB4.

Also, among the setting items in the new image pickup condition, the setting information of the setting items which are not set as the registration items (also referred to "non-registration target items" or "non-registration items") is generated on the basis of the saved image pickup condition TB3 recorded in the RAM 110A when the registration call image pickup mode 55 is set.

To be more specific, in FIG. 10, the setting information of the setting item A, the setting item E, and the setting item F which are the non-registration items is decided while reflecting the respective setting information of the setting item A, the setting item E, and the setting item F in the saved image pickup condition TB3. To be more specific, the setting information A2, E2, and F2 in the saved image pickup condition TB3 is set as the respective setting information of the setting item A, the setting item E, and the setting item F in the new image pickup condition TB4.

In this manner, in a case where the image pickup mode is set as the registration call image pickup mode 55, the registration image pickup condition TB2 registered in the RAM 110A is called by the image pickup condition generation unit 116, and a new image pickup condition TB4 which reflects the registration image pickup condition TB2 is generated, and also among the new image pickup condition TB4, the setting information of lacking setting items (the non-registration items) is generated on the basis of the setting information of the corresponding setting items in the saved image pickup condition TB3.

It should be noted that the call operation RP4 is executed by the user on the registration call screen which is displayed when the registration call image pickup mode 55 is activate through the dial operation of the mode dial 5. To be more specific, the call operation RP4 is executed on a registration call screen GN4 illustrated in FIG. 11 with use of the direction selection key 17 by selecting the registration source of the image pickup condition from a registration source display TH2 (in FIG. 11, "registration source 1" is selected) and pressing the enter button 17a.

As described above, in the image pickup apparatus 1, by selecting and registering the desired setting items from among the setting items in the image pickup condition, the setting information related to the desired setting items is read out, and it is possible to generate the new image pickup condition.

Next, the generation method for the image pickup condition generation in the case where the image pickup mode is set in one of the image pickup modes 51 to 54 within the exposure image pickup mode group GP1 will be described.

In this case, as illustrated in FIG. 12, the new image pickup condition TB5 is set on the basis of the saved image pickup condition TB3 previously recorded in the RAM 110A.

For example, in FIG. 12, the setting information of the respective setting items A to F in the new image pickup condition TB5 is decided while reflecting the setting information of the setting items A to F having been set before the mode change in the image pickup condition TB3 in one of the image pickup modes 51 to 54 within the exposure image pickup mode group GP1. To be more specific, the setting information A2 to F2 of the saved image pickup condition TB3 is set as the respective setting information of the setting items A to F in the new image pickup condition TB5.

In this manner, in a case where the mode is changed into one of the image pickup modes 51 to 54 within the exposure image pickup mode group GP1, in the new image pickup condition TB5, the image pickup condition TB3 set before the mode change in one of the image pickup modes 51 to 54 within the exposure image pickup mode group GP1 is saved. For example, when the image pickup mode is transited from the P mode 51 to the A mode 52, the image pickup condition generation unit 116 carries out a control to inherit the image pickup condition set in the P mode 51 to the A mode 52. Also, for example, after the mode is temporarily changed from the image pickup mode (for example, the P mode 51) within the exposure image pickup mode group GP1 to another image pickup mode (for example, the portrait mode 61 or the registration call image pickup mode 55) other than the exposure image pickup mode group GP1, in a case where the mode is changed again into the image pickup mode (for example, the M mode 54) within the exposure image pickup mode group GP1, the new image pickup condition inherits the image pickup condition set in the image pickup mode (for example, the P mode 51) before the mode change within the exposure image pickup mode group GP1.

It should be noted that upon the mode change within the exposure image pickup mode group GP1, the image pickup condition related to the shutter speed and the aperture value is inherited between the image pickup modes which the user can set. To be more specific, the setting information related to the shutter speed is mutually inherited between the S mode 53 and the M mode 54 where the shutter speed can be manually set, and the setting information related to the aperture value is mutually inherited between the A mode 52 and the M mode 54 where the aperture value can be manually set. In contrast to this, in the mode change between other modes within the exposure image pickup mode group GP1, the image pickup conditions related to the shutter speed and the aperture value are not inherited.

Next, the generation method for the image pickup condition generation in the case where the image pickup mode is changed into one of the image pickup modes 56 to 60 within the scene image pickup mode group GP2 will be described.

In this case, the image pickup condition for each image pickup scene is read out by the image pickup condition generation unit 116 from the storage unit (the RAM 110A) to be set as the new image pickup condition.

For example, in FIG. 12, regarding the new image pickup condition TB6, the setting information A3 to F3 of the image pickup condition stored in the RAM 110A is set as the respective setting information of the setting items A to F in the new image pickup condition TB6. It should be noted that the image pickup condition for each image pickup scene is previously stored in the ROM 110B, and when the power source of the image pickup apparatus 1 is turned ON, the image pickup condition is read out from the ROM 110B and stored in the RAM 110A.

In this manner, in a case where the image pickup mode is set as one of the image pickup modes 56 to 60 within the scene image pickup mode group GP2, no influences of the image pickup condition set in the other image pickup mode are affected, and the image pickup condition inherent to the respective changed image pickup modes 56 to 60 is set as the new image pickup condition TB6.

Also, in a case where the image pickup mode is changed into the auto image pickup mode 50, no influences of the image pickup condition set in the other image pickup mode are affected, and the optimal image pickup condition automatically obtained by the image pickup apparatus 1 is set as the new image pickup condition.

As described above, the image pickup apparatus 1 according to the embodiment of the present invention is provided with the image pickup condition setting control unit 112 for setting the respective setting information of the plurality of setting items related to the image pickup condition, the RAM 110A, the registration item setting control unit 114 for specifying the registration target items to be set as the registration target from among the plurality of setting items in accordance with the instruction operation of the user, the image pickup condition registration control unit 115 for registering the setting information set in the registration target items as the registration image pickup condition in the RAM 110A, and the image pickup condition generation unit 116 for calling the registration image pickup condition from the storage means in accordance with the call operation RP4 of the user to generate the new image pickup condition which reflects the registration image pickup condition.

With this configuration, the registration target items are specified as the registration target among the plurality of setting items, and the setting information set regarding the registration target items is registered as the registration image pickup condition in the storage means. Thus, it is possible to eliminate such an inconvenience that the setting items which are not desired to be set as the registration targets are also registered.

Also, the image pickup apparatus 1 is further provided with the image pickup condition recording control unit 113 for recording the image pickup condition set in the mode other than the registration call image pickup mode 55 (herein, the respective image pickup modes 51 to 54 within the exposure image pickup mode group GP1) in the RAM 110A as the saved image pickup condition, and the image pickup condition generation unit 116 generates the setting information of the non-registration target items other than the registration target items among the setting items in the new image pickup condition on the basis of the saved image pickup condition.

With this configuration, the new image pickup condition which reflects the image pickup condition related to the desired setting items set as the registration target can be generated and set in the image pickup apparatus 1.

Modified Examples

In the above, the embodiments of the present invention are described, but the present invention is not limited to the above-mentioned description.

Figure 13:
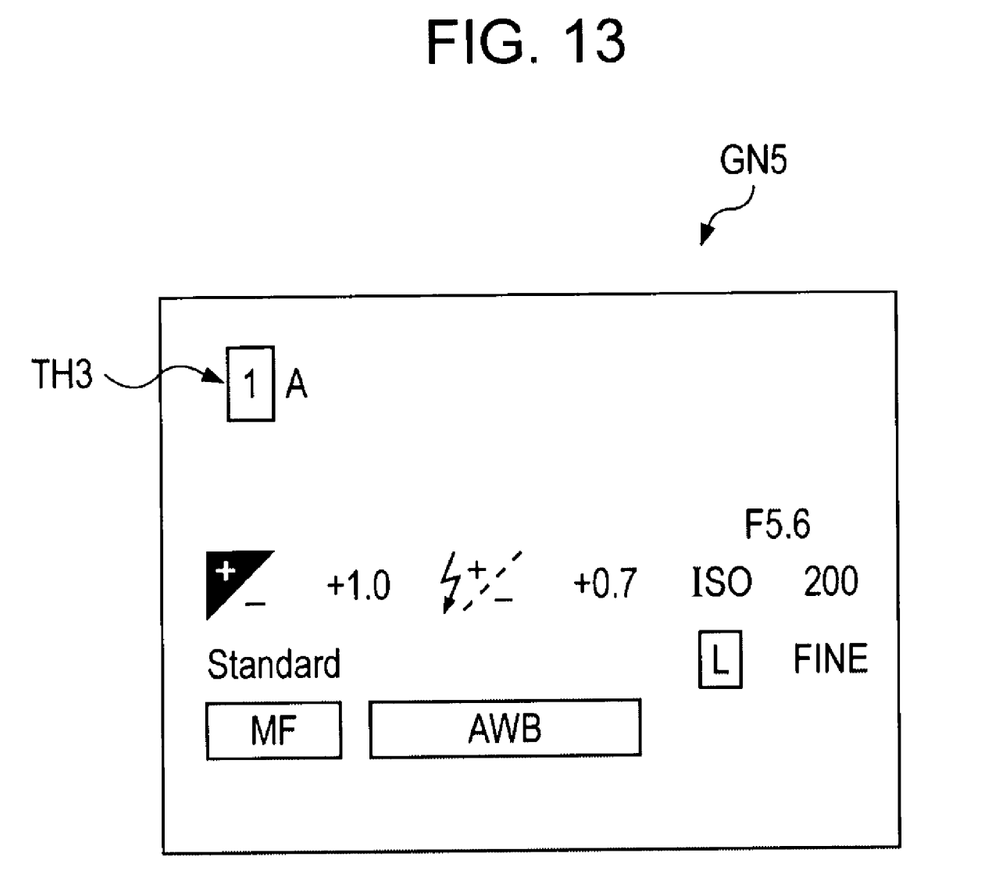
FIG. 13 illustrates an example of a screen for carrying out the call operation of the registration image pickup condition.

For example, in the call operation RP4 according to the above-mentioned embodiment, the registration source of the image pickup condition is selected from the registration source display TH2 of the registration call screen GN4 (refer to FIG. 11) to be executed, but the configuration is not limited to this. FIG. 13 illustrates an example of a registration call screen GN5.

To be more specific, instead of a display "MR" representing the registration call image pickup mode 55, the registration source of the registration image pickup condition is directly displayed on the mode dial 5, and by setting the display of the registration source desired to be called at the predetermined position TP, the desired registration image pickup condition may also be easily called.

In this case, on the registration call screen GN5 (refer to FIG. 13), the registration source selected as the registration source display TH3 (the registration source 1 in FIG. 13) is displayed, and also the image pickup condition registered in the registration source is displayed.

Also, according to the above-mentioned embodiment, the "registration" item TK is selected on the menu screen GN2 (refer to FIG. 8) which is displayed when the menu button 16 is pressed, and the registration setting screen GN3 (refer to FIG. 9) is displayed, but the configuration is not limited to this.

To be more specific, the image pickup apparatus 1 is provided with a registration button 18 (refer to FIG. 3), and in accordance with the detection of the press of the registration button 18, the registration setting screen GN3 may be displayed. With this configuration, as the number of operation steps in the image pickup condition registration operation RP3 is decreased, it is possible for the user to easily carry out the image pickup condition registration operation RP3.

Figure 14:
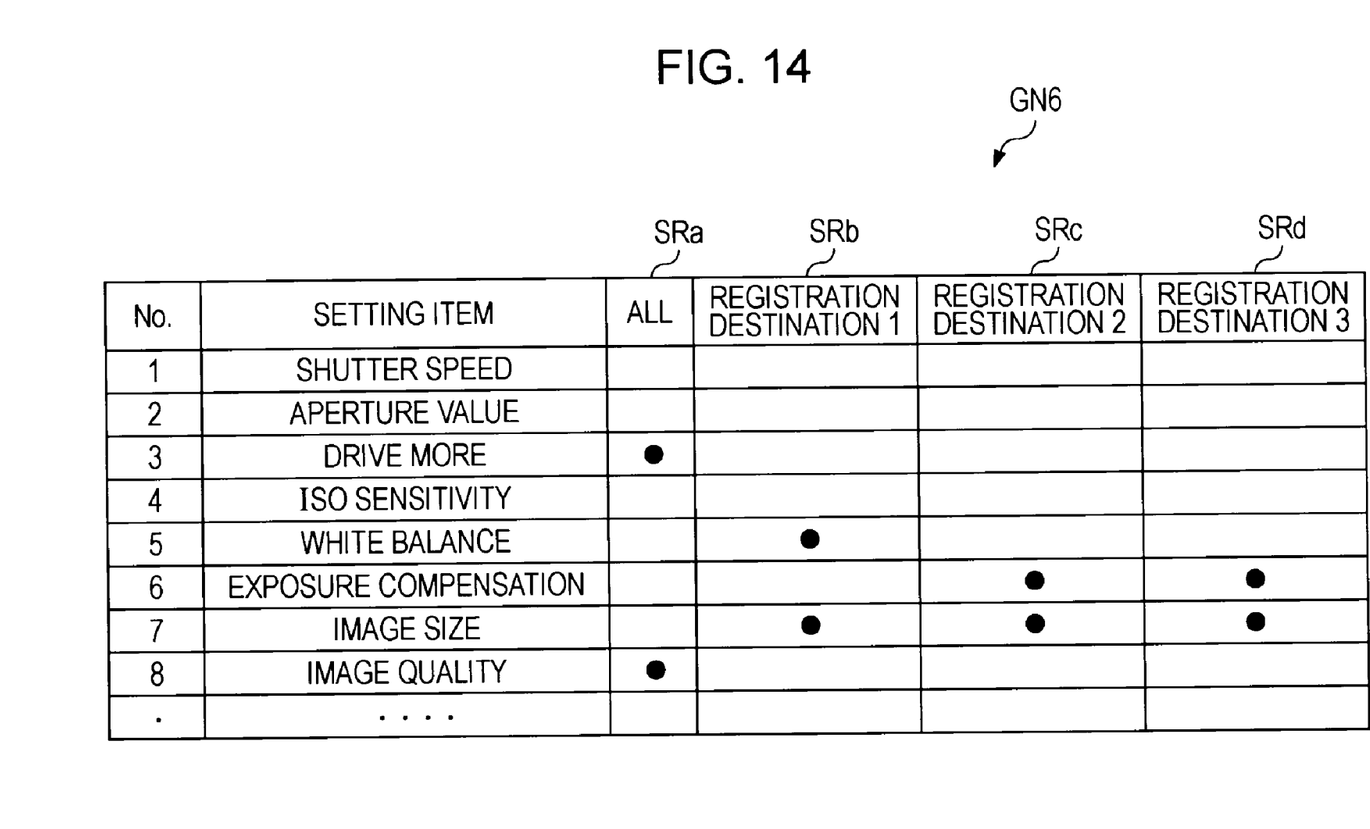
FIG. 14 illustrates an example of a registration item selection screen according to a modification example.

Also, according to the above-mentioned embodiment, the set registration items are commonly applied to each registration destination of the image pickup condition, but the configuration is not limited to this. FIG. 14 illustrates an example of a registration item selection screen GN6 according to a modified example To be more specific, as illustrated in FIG. 14, on the registration item selection screen GN6, the select column SR of the registration items is provided for each registration destination, and such a configuration may be adopted that the registration items can be set for each registration destination. In FIG. 14, the setting items selected in a select column SRb are effective as the registration items regarding the image pickup condition registered in "registration destination 1", the setting items selected in a select column SRc are effective as the registration items regarding the image pickup condition registered in "registration destination 2", and the setting items selected in a select column SRd are effective as the registration items regarding the image pickup condition registered in "registration destination 3". For example, the white balance is the registration item regarding the image pickup condition registered in "registration destination 1", the exposure compensation the registration item regarding the image pickup condition registered in "registration destination 2" and "registration destination 3".

Also, the setting items selected in the select column SRa are effective in all the registration destinations ("registration destination 1", "registration destination 2", and "registration destination 3"). For example, the drive mode is the registration item regarding the image pickup condition registered in "registration destination 1", "registration destination 2", and "registration destination 3". It should be noted that when a select display is added to a select column SRa which affects all the registration destinations, regarding the setting items to which the select display is added, the select display added to the other select columns SRb, SRc, and SRd is automatically deleted.

In this manner, the select column SR of the registration item is provided to each registration destination, and when such a configuration is adapted that the individual registration item can be set to each registration destination, it is possible to carry out the registration of the image pickup condition with a high degree of freedom to the user.

Also, according to the above-mentioned embodiment, the case where while the power source is turned ON, the saved image pickup condition and the registration image pickup condition are saved in the RAM 110A has been exemplified, but the configuration is not limited to this. To be more specific, in a state where the power source is turned ON, the saved image pickup condition and the registration image pickup condition may be saved in the ROM 110B.

Also, according to the above-mentioned embodiment, the case where the registration source of the image pickup condition is selected from among the registration source display TH2 by using the direction selection key 17 on the registration call screen GN4 illustrated in FIG. 11 and the call operation RP4 is executed by pressing the enter button 17a has been exemplified, but the configuration is not limited to this.

To be more specific, the call operation RP4 may be executed in a state where the registration destination is selected on the registration call screen GN4 in accordance with the detection of the half press state of the release button 11. In this case, when the press of the release button 11 is detected, the new image pickup condition TB4 is immediately decided on the basis of the registration image pickup condition TB2 and the saved image pickup condition TB3.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus having a plurality of setting items related to an image pickup condition, the image pickup apparatus comprising:
   setting means for setting respective setting information of the plurality of setting items;
   storage means;
   specification means for specifying a registration target item to set a registration target from among the plurality of setting items in accordance with an instruction operation;
   registration control means for registering the setting information set by the setting means regarding the registration target item in the storage means as a registration image pickup condition; and
   generation means for calling the registration image pickup condition from the storage means and non-registration target items from a saved image pickup condition in accordance with a call operation to generate a new image pickup condition which reflects the registration image pickup condition.

2. The image pickup apparatus according to claim 1, wherein
   the generation means adopts the setting information of the registration target item registered in the storage means as setting information of a setting item corresponding to the registration target item in the new image pickup condition.

3. The image pickup apparatus according to claim 1, wherein
   the storage means includes a non-volatile memory which saves registration image pickup condition.

4. The image pickup apparatus according to claim 1, wherein the setting means sets multiple setting information of the plurality of individual setting items such that the registration control means registers the multiple setting information as multiple image pickup conditions.

5. The image pickup apparatus according to claim 1, wherein the setting items include at least a shutter speed, an aperture value, a drive mode, an ISO sensitivity, a white balance, an exposure compensation, an image size, and an image quality.

6. The image pickup apparatus according to claim 1, wherein the setting information in the saved image pickup condition is modified before an image pickup mode change.

7. An image pickup apparatus having a plurality of setting items related to an image pickup condition, the image pickup apparatus comprising:
   a setting unit adapted to set respective setting information of the plurality of setting items;
   a storage unit;
   a specification unit adapted to specify a registration target item to set a registration target from among the plurality of setting items in accordance with an instruction operation;
   a registration control unit adapted to register the setting information set by the setting unit regarding the registration target item in the storage unit as a registration image pickup condition; and
   a generation unit adapted to call the registration image pickup condition from the storage unit and non-registration target items from a saved image pickup condition in accordance with a call operation to generate a new image pickup condition which reflects the registration image pickup condition.

8. The image pickup apparatus according to claim 7, wherein the generation means calls the registration image pickup condition from the storage means when a dial is turned to a predetermined location that specifies a registration image pickup condition source.

9. The image pickup apparatus according to claim 7, wherein the generation means calls the registration image pickup condition from the storage means when a button is in a press state.

10. The image pickup apparatus according to claim 7, wherein the generation means calls the registration image pickup condition from the storage means when a button is in a half press state.

11. An image pickup apparatus having a plurality of setting items related to an image pickup condition, the image pickup apparatus comprising:

setting means for setting respective setting information of the plurality of setting items;

storage means;

specification means for specifying a registration target item to set a registration target from among the plurality of setting items in accordance with an instruction operation;

registration control means for registering the setting information set by the setting means regarding the registration target item in the storage means as a registration image pickup condition;

generation means for calling the registration image pickup condition from the storage means in accordance with a call operation to generate a new image pickup condition which reflects the registration image pickup condition; and record control means for recording the respective setting information set by the setting means regarding the plurality of setting items in the storage means, wherein the call operation includes an operation for activating a call mode in which the registration image pickup condition is called from the storage means, wherein the record control means records the respective setting information set in a mode other than the call mode in the storage means as a saved image pickup condition, and wherein the generation means generates setting information of a non-registration target item other than the registration target item among the setting items in the new image pickup condition on the basis of the saved image pickup condition.

* * * * *